(12) United States Patent
Shen et al.

(10) Patent No.: US 7,292,401 B2
(45) Date of Patent: Nov. 6, 2007

(54) SYSTEM AND METHOD FOR DETERMINING HEAD-DISK CONTACT IN A MAGNETIC RECORDING DISK DRIVE BY MAGNETORESISTIVE SIGNAL AMPLITUDE

(75) Inventors: Yong Shen, Saratoga, CA (US); Jing Zhang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 31 days.

(21) Appl. No.: 11/376,660

(22) Filed: Mar. 14, 2006

(65) Prior Publication Data

US 2007/0217051 A1    Sep. 20, 2007

(51) Int. Cl.
*G11B 15/18* (2006.01)
(52) U.S. Cl. ........................................................ 360/69
(58) Field of Classification Search ................. 360/75, 360/46, 31, 25, 77.06, 69, 55
See application file for complete search history.

(56) References Cited

U.S. PATENT DOCUMENTS

| | | | |
|---|---|---|---|
| 5,021,906 A | | 6/1991 | Chang et al. |
| 5,130,866 A | | 7/1992 | Klaassen et al. |
| 5,276,573 A | | 1/1994 | Harada et al. |
| 5,455,730 A | | 10/1995 | Dovek et al. |
| 5,777,815 A | * | 7/1998 | Kasiraj et al. ................ 360/75 |
| 5,991,113 A | | 11/1999 | Meyer et al. |
| 6,088,176 A | * | 7/2000 | Smith et al. .................. 360/46 |
| 6,344,949 B1 | | 2/2002 | Albrecht et al. |
| 6,407,874 B1 | | 6/2002 | Smith et al. |
| 6,417,981 B1 | * | 7/2002 | Smith ........................... 360/75 |
| 6,452,735 B1 | * | 9/2002 | Egan et al. ................... 360/31 |
| 6,459,539 B1 | | 10/2002 | Carlson et al. |

(Continued)

FOREIGN PATENT DOCUMENTS

JP    2004335069    11/2004

OTHER PUBLICATIONS

Smith et al., "Dynamic In-Situ Measurements of Head-to-Disk Spacing", IEEE Trans Magn, vol. 35, No. 5, Sep. 1999, pp. 2346-2351.

(Continued)

*Primary Examiner*—Fred F. Tzeng
(74) *Attorney, Agent, or Firm*—Thomas R. Berthold

(57) ABSTRACT

A system and method for determining head-disk contact (HDC) in a disk drive uses the signal from the magnetoresistive (MR) read head and does not require the presence of magnetic transitions on the disk. The method thus has application in head-disk testers or "spin stands" to facilitate the design and testing of slider-suspension assemblies and fly-height actuators, as well as in disk drives to take corrective action before HDC and/or to control fly-height actuators. The invention is also a magnetic recording disk drive that has a fly-height actuator and a low-pass filter and comparator circuit for the MR signal. When the output of the filter exceeds a threshold the comparator circuit output indicates the onset of HDC. The comparator circuit output is input to a digital processor or controller. When the controller determines the onset of HDC or that HDC has occurred, it generates a control signal that can be used to cause the disk drive to take corrective action.

5 Claims, 4 Drawing Sheets

U.S. PATENT DOCUMENTS

| | | | |
|---|---|---|---|
| 6,479,988 B2 * | 11/2002 | Hachisuka et al. | 324/210 |
| 6,501,606 B2 * | 12/2002 | Boutaghou et al. | 360/25 |
| 6,570,730 B1 * | 5/2003 | Lewis et al. | 360/75 |
| 6,600,622 B1 * | 7/2003 | Smith | 360/77.06 |
| 6,611,399 B1 | 8/2003 | Mei et al. | |
| 6,671,110 B2 | 12/2003 | Baba et al. | |
| 6,674,590 B2 | 1/2004 | Ottesen et al. | |
| 6,717,776 B2 | 4/2004 | Boutaghou | |
| 6,735,027 B2 | 5/2004 | Helsel et al. | |
| 6,765,745 B2 | 7/2004 | Smith et al. | |
| 6,775,103 B2 | 8/2004 | Kang et al. | |
| 6,801,376 B2 * | 10/2004 | Smith | 360/31 |
| 6,865,040 B2 | 3/2005 | Fayeulle et al. | |
| 7,016,131 B2 * | 3/2006 | Liu et al. | 360/31 |
| 7,119,979 B2 * | 10/2006 | Fong et al. | 360/75 |
| 7,180,692 B1 * | 2/2007 | Che et al. | 360/31 |
| 7,215,495 B1 * | 5/2007 | Che et al. | 360/31 |
| 2001/0050826 A1 | 12/2001 | Helsel et al. | |
| 2003/0067698 A1 | 4/2003 | Dakrour et al. | |
| 2003/0156340 A1 * | 8/2003 | Jen et al. | 360/31 |
| 2004/0179299 A1 | 9/2004 | Sasaki et al. | |
| 2004/0218302 A1 | 11/2004 | Maat | |
| 2004/0240099 A1 | 12/2004 | Brannon et al. | |
| 2004/0240109 A1 | 12/2004 | Hamann | |
| 2005/0013036 A1 | 1/2005 | Yang | |
| 2005/0024761 A1 | 2/2005 | Lou | |
| 2005/0024775 A1 | 2/2005 | Kurita | |
| 2005/0046982 A1 | 3/2005 | Liu | |
| 2005/0046983 A1 | 3/2005 | Suk | |
| 2005/0046985 A1 | 3/2005 | Morinaga et al. | |
| 2005/0046995 A1 | 3/2005 | Lille | |
| 2005/0052773 A1 | 3/2005 | Suk | |
| 2005/0057841 A1 | 3/2005 | Stover et al. | |
| 2005/0094299 A1 | 5/2005 | Tokizono et al. | |
| 2005/0094303 A1 | 5/2005 | Chan | |
| 2005/0152055 A1 * | 7/2005 | Biskeborn | 360/31 |
| 2006/0203376 A1 * | 9/2006 | Yoshioka et al. | 360/75 |

OTHER PUBLICATIONS

Li et al., "Real-Time Method to Measure Head Disk SpacingVariation Under Vibration Conditions", IEEE Trans on Instrumentation and Meas, vol. 52, No. 3, Jun. 2003, pp. 916-920.

Tanaka et al., "Slider Dynamics During Continuous Contact with Textured and Smooth Disks in Ultra Low Flying Height", IEEE Trans Magn, vol. 37, No. 2, Mar. 2001, pp. 906-911.

Khurshudov et al., "Head-disk contact detection in the hard-disk drives", Wear 255 (2003) 1314-1322.

Hughes, "Improved Disk Drive Failure Warnings", IEEE Trans Reliability, Sep. 2002, pp. 1-10.

* cited by examiner

SYSTEM AND METHOD FOR DETERMINING HEAD-DISK CONTACT IN A MAGNETIC RECORDING DISK DRIVE BY MAGNETORESISTIVE SIGNAL AMPLITUDE

BACKGROUND OF THE INVENTION

1. Field of the Invention

This invention relates to magnetic recording disk drives, and more particularly to a system and method for determining contact of the read/write head or the head carrier with the disk.

2. Description of the Related Art

Magnetic recording hard disk drives use a read/write transducer or head mounted on a head carrier for reading and/or writing data to the disk. The head carrier is typically an air-bearing slider attached to an actuator arm by a suspension and positioned very close to the disk surface by the suspension. There are typically a stack of disks in the disk drive with a slider-suspension assembly associated with each disk surface in the stack.

The separation between the head and the disk surface is called the fly height. The slider has a disk-facing air-bearing surface (ABS) that causes the slider to ride on a cushion or bearing of air generated by rotation of the disk. The slider is attached to a flexure on the suspension and the suspension includes a load beam that applies a load force to the slider to counteract the air-bearing force while permitting the slider to "pitch" and "roll". The flying dynamics of the slider and thus the fly height are influenced by factors such as the rotation speed of the disk, the aerodynamic shape of the slider's ABS, the load force applied to the slider by the suspension, and the pitch and roll torques applied to the slider by the suspension.

Disk drives are susceptible to failure of the slider-disk interface which can result in a head "crash" during operation. This may result in loss of data or complete failure of the disk drive. Because head crashes can not always be prevented, it is important that contact of the slider with the disk, or contact of the read or write head with the disk, collectively called head-disk contact (HDC), be detectable or predictable. In the event of an impending head crash, as judged by HDC detection circuitry, a warning should be provided so that critical data can be backed up either manually or automatically. One type of HDC warning system can be implemented in disk drives that use SMART (Self-Monitoring Analysis and Reporting Technology).

Disk drives have been proposed that use a fly-height actuator for changing the spacing between the head and the disk surface. One type of fly-height actuator is a thermal actuator with an electrically-resistive heater located on the slider near the head. When power is applied to the heater the heater expands and causes the head to "protrude" and thus move closer to the disk surface. Other fly-height actuators for moving the head relative to the slider include electrostatic microactuators and piezoelectric actuators. Another type of fly-height actuator, also based on thermal, electrostatic or piezoelectric techniques, changes the head-disk spacing by altering the air-flow or the shape of the slider's ABS. In disk drives that have a fly-height actuator it is important to be able to determine the onset of HDC so that the fly-height actuator can be accurately controlled.

A method for determining HDC is also important during the design and testing of disk drive components, in particular the slider ABS and the fly-height actuator, with the use of a head-disk tester.

For all of these reasons a system and method is needed for reliable determination of HDC in a magnetic recording disk drive.

SUMMARY OF THE INVENTION

The invention is a system and method for determining HDC in a disk drive using the signal from the magnetoresistive (MR) read head. The method has application in head-disk testers or "spin stands" to facilitate the design and testing of slider-suspension assemblies and fly-height actuators, as well as in disk drives to take corrective action before HDC and/or to control fly-height actuators. The invention is also a magnetic recording disk drive that has a fly-height actuator and a low-pass filter and comparator circuit for the MR signal. When the output of the filter exceeds a threshold the comparator circuit output indicates the onset of HDC. The comparator circuit output is input to a digital processor or controller. When the controller determines the onset of HDC or that HDC has occurred, it generates a control signal that can be used to cause the fly-height actuator to increase the head-disk spacing or to take corrective action, such as inhibiting the writing of data. The invention does not require the presence of magnetic transitions on the disk, and is thus operable with and without recorded data on the disk. The amplitude of the MR signal is detected at low frequency, generally below about 3 MHz, which is well below the frequency of recorded data so the MR signal is essentially noise at this low frequency spacing.

For a fuller understanding of the nature and advantages of the invention, reference should be made to the following detailed description taken together with the accompanying figures.

DETAILED DESCRIPTION OF THE INVENTION

The invention is applicable not only to magnetic recording disk drives, but also to head-disk testers or "spin stands" that are used in disk drive manufacturing to design and test the head-disk interface in magnetic recording disk drives. The invention is applicable to conventional disk drives that do not have active control of the head-disk spacing, as well as to disk drives with head fly-height actuators that move the read-write head relative to the slider or alter the air-flow or shape of the slider's air-bearing surface (ABS) to control the head-disk spacing.

Figure 1:
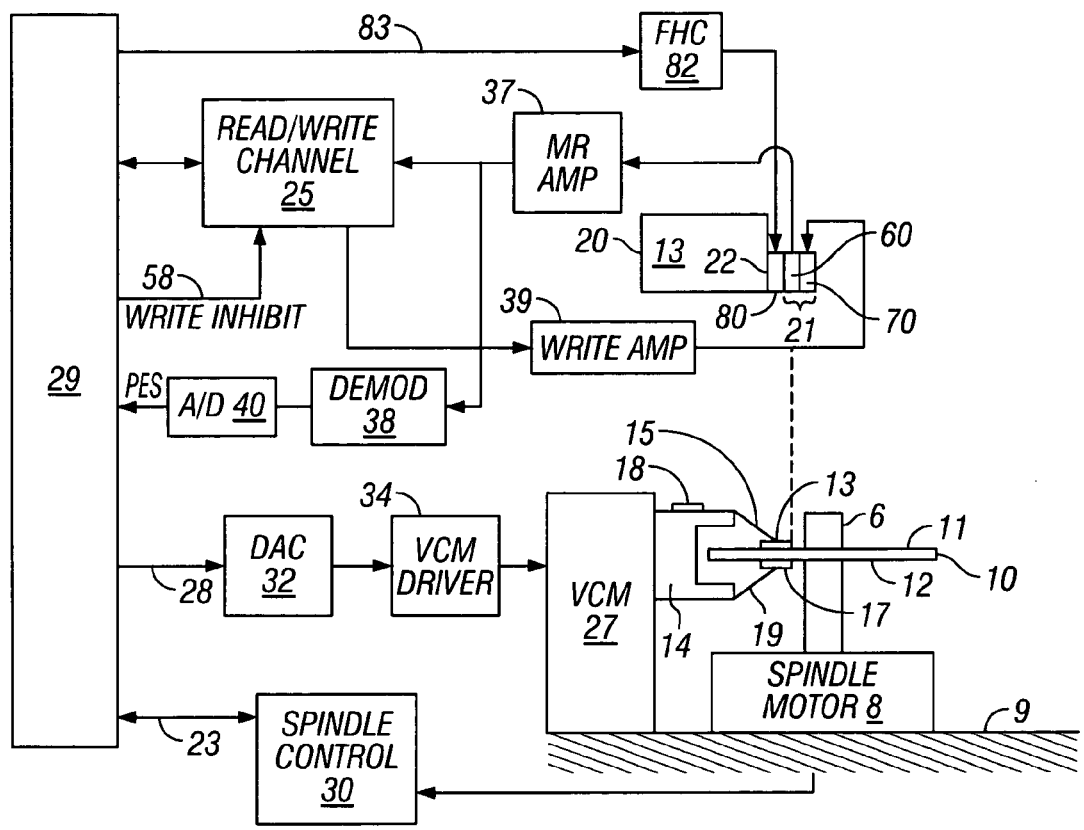
FIG. 1 is a schematic block diagram of a magnetic recording disk drive.

FIG. 1 is a schematic block diagram of a magnetic recording disk drive. The disk drive includes a magnetic recording disk 10 with surfaces 11 and 12, each of which contains a magnetic recording layer. The disk 10 is mounted on a spindle 6 and rotated by a spindle motor 8 about an axis perpendicular to the disk surfaces 11, 12. A head carrier or slider 13 is positioned near the surface 11 of disk 10. Slider 13 is an air-bearing slider having an air-bearing surface (ABS) 20 facing toward the disk surface 11 and a trailing end 22. Slider 13 supports a read/write transducer or head 21 on its trailing end 22 for reading and writing data to the magnetic media on disk surface 1. The head 21 is a dual-element head having an inductive write element or head 70 and an MR read element or head 60. Slider 13 is attached to an actuator arm 14 by means of a suspension 15. The suspension 15 provides a spring force that biases the slider 13 toward the disk surface 11. A second head carrier or slider 17, also supporting a read/write head, is positioned on surface 12 of disk 10 and is attached to actuator arm 14 by means of suspension 19.

Actuator arm 14 is attached to a rotary actuator 27. The actuator is typically a rotary voice coil motor (VCM) that comprises a coil movable within a fixed magnetic field, the direction and velocity of the coil movements being controlled by motor current signals supplied by a hard-disk controller 29. As the disk 10 rotates, the rotary actuator 27 moves the sliders 13, 17 in a generally arcuate path radially in and out over their respective disk surfaces 11, 12 so that the read/write heads may access different portions of the magnetic recording layers where data is desired to be read or recorded. Both the actuator 27 and spindle motor 8 are mounted to a portion of the disk drive housing 9.

Figure 2:
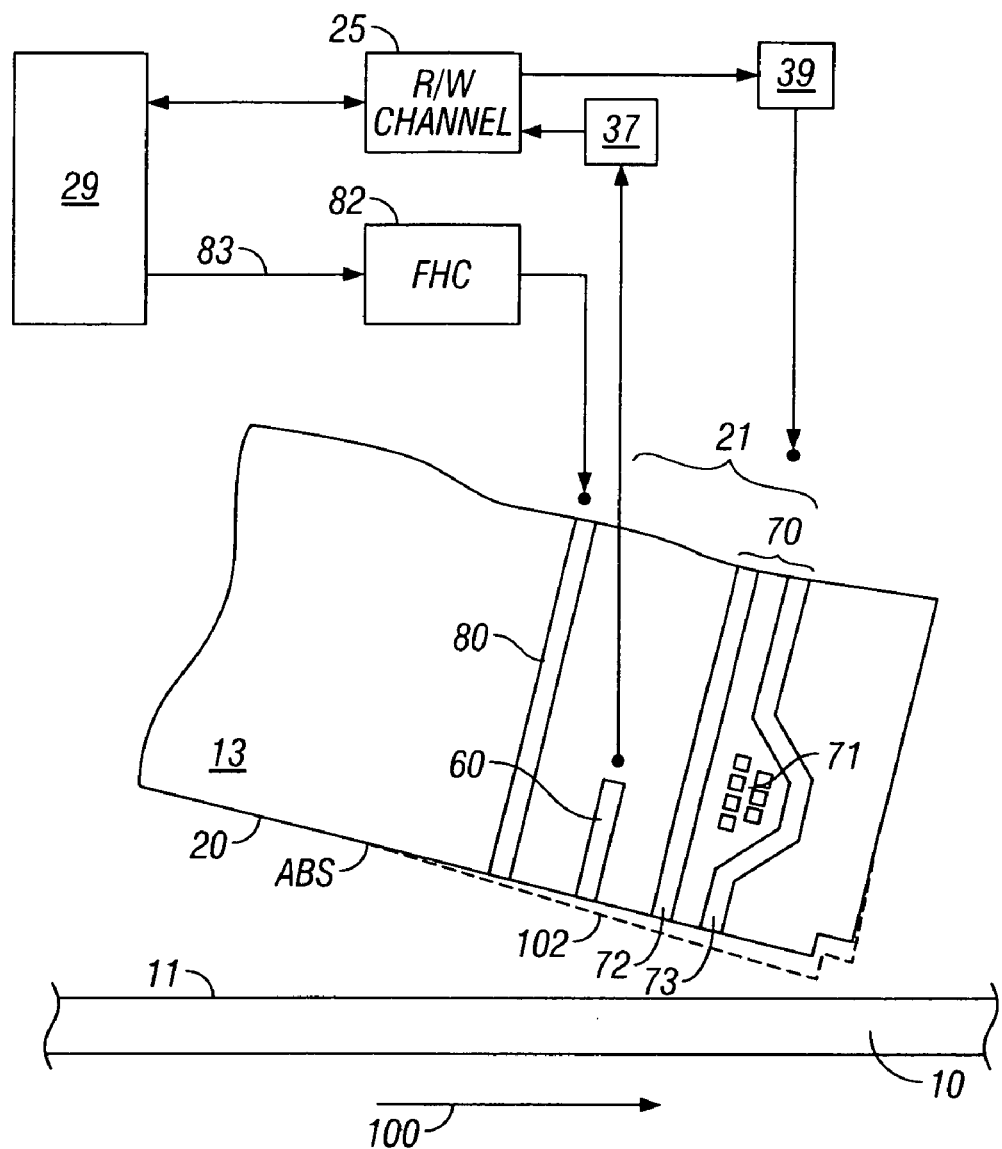
FIG. 2 is a sectional view of the end portion of air-bearing slider above the surface of a disk and illustrates a thermal fly-height actuator, a read head and a write head on the slider.

FIG. 2 is a sectional view of the end portion of slider 13 above the surface 11 of disk 10. The rotation of the disk 10 in the direction of arrow 100 generates an air bearing between the ABS of slider 13 and disk surface 11. During operation of the disk drive, the air bearing counterbalances the slight spring force of the suspension and supports the slider 13 off and slightly away from the disk surface 11 by a small, substantially constant spacing. FIG. 2 also shows the read/write head 21, i.e., a magnetoresistive (MR) read head 60 and write head 70. Write head 70 is an inductive write head with coil 71 located between the two write poles 72, 73.

The slider 13 also includes a fly-height actuator for changing the spacing between read/write head 21 and the disk surface 11. The type of fly-height actuator shown in FIG. 2 is a thermal actuator with an electrically-resistive heating element or heater 80 electrically connected to and controlled by a fly-height controller (FHC) 82. FHC 82 is a power source that controls the amount of current or voltage to the heater 80, such as by controlling the settings of a variable resistor. As the current increases, the heater 80 expands and causes the MR read head 60 and pole tips 71, 72 of write head 70 to "protrude" from the ABS and thus closer to disk surface 11, as shown by the dashed line 102. The FHC 82 may include a temperature feedback control circuit that monitors the temperature of the heater 80 to maintain the fly height of the head within a desired range during operation of the disk drive.

A thermal fly-height actuator is described in U.S. Pat. No. 5,991,113 and published patent application US 2005/0024775 A1. Other fly-height actuators for moving the head relative to the slider include electrostatic microactuators, such as described in U.S. Pat. No. 6,611,399 B1, and piezoelectric actuators, such as described in U.S. Pat. No. 6,570,730 B1. Another type of fly-height actuator changes the head-disk spacing by altering the air-flow or the shape of the slider's ABS. This type of fly-height actuator includes thermal actuators, such as described in U.S. Pat. No. 6,775,103 B2, electrostatic actuators, such as described in U.S. Pat. Nos. 5,276,573 and 6,344,949, and piezoelectric actuators, such as described in U.S. Pat. No. 5,021,906.

Referring again to FIG. 1, the various components of the disk drive are controlled by control signals generated by digital controller 29. Controller 29 is a digital signal processor that includes logic control circuits, memory storage, and a microprocessor. Controller 29 generates control signals for the various drive operations, such as control signals on line 23 to spindle motor controller 30, track following and track seek control signals on line 28 for actuator 27, and control signals on line 83 to FHC 82.

Data from disk surface 11 is read by the MR read head 60. The MR signal is amplified by amplifier 37. The amplifier 37 and other read signal processing circuitry, as well as the circuitry for generating the sense or bias current to the MR read head 60, are typically part of an integrated circuit module 18 (FIG. 1) located on actuator arm 14. The module 18 is placed close to the read/write head 21 to keep the interconnections as short as possible, and is thus called the arm electronics module. The output from MR amplifier 37 is sent to the read/write (R/W) channel 25 where the analog signal from the MR read head 60 is processed into digital signals representing data recorded on the magnetic recording layer of disk surface 11. R/W channel 25 typically includes circuitry for automatic gain control, analog-to-digital conversion, and digital data detection.

Data is written to the magnetic recording layer of disk surface 11 by write signals sent through R/W channel 25 and write amplifier 39 to inductive write head 70. The inductive write head 70 records a series of magnetic transition representing the recorded data. Write amplifier 39 is typically located in arm electronics module 18. The disk drive may also include the ability to inhibit the writing of data upon the occurrence of some event, typically an external shock or an impending head crash. This is accomplished by a "write inhibit" signal from controller 29 on line 58 to the R/W channel 25.

The track following and seek control signals on line 28 are generated by controller 29 that runs a servo control algorithm in response to input head position error signals (PES). The MR read head 60 reads head position servo information recorded on the disk, typically at equally angularly spaced servo sectors embedded between the data sectors. This analog servo output from MR amplifier 37 is demodulated by demodulator 38 and converted to a digital position error signal (PES) by analog-to-digital (A/D) converter 40. The track following and seek control signals on line 28 are sent to digital-to-analog converter (DAC) 32 that converts them to analog voltage signals which are output to VCM driver 34. VCM driver 34 then sends corresponding current pulses to the coil of VCM actuator 27 to pivot the arm 14 radially inward and outward to move and position the sliders 13, 17 to the desired data tracks on the respective disk surfaces 11, 12.

The invention is a system and method for determining head-disk contact (HDC) in a disk drive using the MR signal. The term "head-disk contact" or HDC means that some portion of the slider, such as the read head 60, the write head 70, or the trailing end 22, is in contact with the disk surface 11. The term "determining" HDC means detecting the onset of HDC or concluding that HDC has occurred or is imminent.

Figure 3:
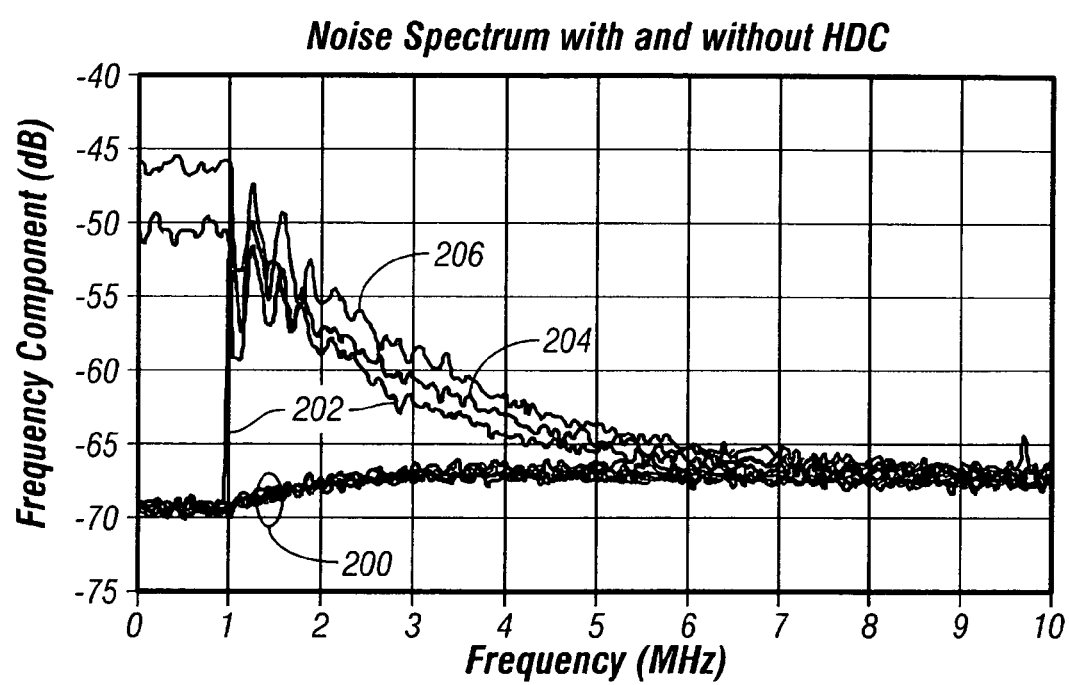
FIG. 3 shows the MR signal frequency spectrum for different levels of power applied to the thermal fly-height actuator.

The invention does not require the presence of magnetic transitions on the disk. The amplitude of the MR signal is detected at low frequency, generally below about 3 MHz. This is well below the frequency of recorded data so the MR signal is essentially noise at this low frequency. FIG. 3 shows a series of MR signal frequency spectrums for various levels of power applied to heater 80 for a particular HGA (the "head-gimbal-assembly", a system including the suspension and slider with the read/write head). An acoustic-emission (AE) sensor was mounted on the arm supporting the HGA to correlate the AE signal with the MR signal frequency spectrum. In this example the region of the disk being monitored was DC-erased and thus contained no magnetic transitions. However, the system and method is also fully applicable to a disk with recorded data. In FIG. 3 the group of traces 200 represents the MR signals with heater power below levels all below about 92 mW, and thus no HDC. Trace 202 represents the MR signal with applied heater power of 116 mW and illustrates the onset of HDC, as shown by the signal below 1 MHz. Traces 204, 206 are MR signals at heater power levels of 133 mW and 147 mW, respectively, and are the frequency spectrums with HDC. In FIG. 3, the frequency range shown is from 0 to 10 MHz. However the frequency range of interest is below about 3 MHz, depending on the mechanical property of the HGA. It is also interesting to note that beyond about 5 MHz the noise levels at HDC merge with the noise levels for no HDC, so at frequencies above about 5 MHz for this particular HGA, the MR signal provides no ability to determine HDC.

In a head-disk tester, also known as a DET (Dynamic Electrical Tester), the system has the advantages that additional hardware is not required because it is not necessary to record magnetic transitions on the disk, and the test time is reduced because it is not necessary to write a test signal and detect the test signal with the read head. Because write current is not needed, this also eliminates the potential impact of write-induced pole tip protrusion. In addition, because the MR signal is not sensitive to many other factors, like radial position of the head on the disk, disk RPM and the type of disk (metal or glass substrate), it is relatively easy to detect for different disk drives and different slider-suspension assemblies.

When the method of the invention is used in a head-disk tester or spin stand it facilitates the design of disk drive components. For disk drives without fly-height actuators, the method allows particular slider-suspension assemblies, slider designs and air-bearing shapes to be evaluated. With the assembly or slider to be studied placed in the tester, the disk rotational speed can be reduced until HDC is determined, in the manner described above, to evaluate the flying characteristics of the slider. For disk drives with fly-height actuators, the method allows particular fly-height actuators to be evaluated by determining the value of the FHC signal, e.g., heater power for a thermal actuator, at which HDC occurs. Also, because the method is applicable to disks with and without recorded data, the method can also be used with disks having no magnetic recording layer.

The data shown in FIG. 3 was accumulated using a head-disk tester or spin stand, such as the RH-4160E DET from Hitachi DECO with XY-positioning, with the MR signal being input to either an internal spectrum analyzer on the DET or an external commercially available spectrum analyzer or digital oscilloscope. Other types of spin stand include the Guzik Model V2002 XY-positioning spin stand from Guzik Technical Enterprises. Digital oscilloscopes and digital disk drive analyzers, such as those available from LeCroy Corporation, digitize the MR signal by an analog-to-digital converter (ADC) to create a data set that is stored in the memory of a microprocessor. The data set is processed and sent to the display. In addition, complex processing of the digital signal can be performed by high-speed digital signal processing circuits. The oscilloscope or analyzer includes programmable signal analysis software that can extract many useful time-domain features (e.g., rise time, pulse width, amplitude), frequency spectra, and other parameters, and is thus able to calculate the MR signal amplitude in the desired frequency range.

Figure 4:
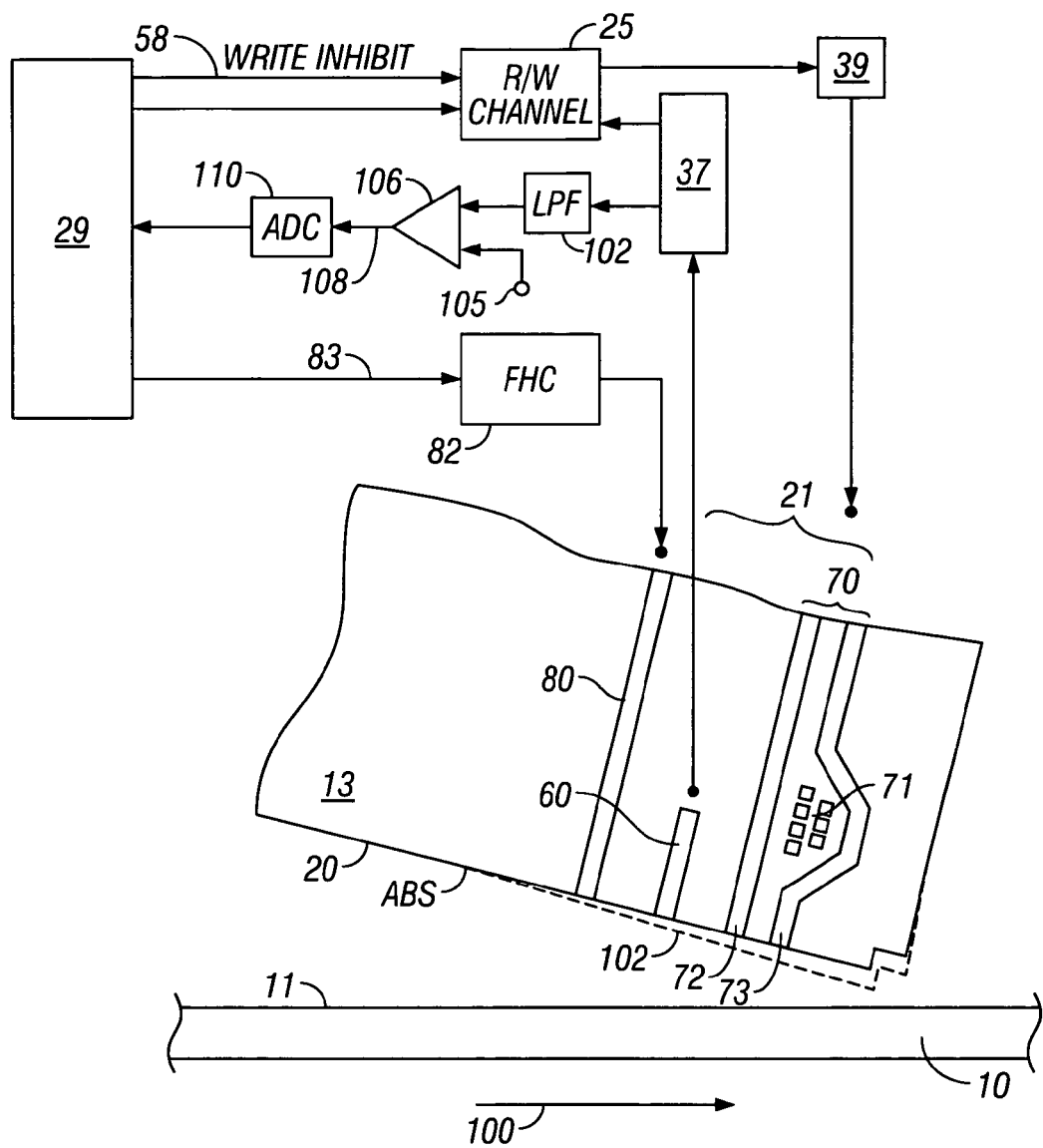
FIG. 4 is a schematic block diagram of a magnetic recording disk drive that incorporates the method for determining HDC according to this invention.

However, the method of the invention can also be implemented in a disk drive. As shown in FIG. 4, the MR signal from MR amplifier 37 is sent to a low-pass filter (LPF) 102 that passes only frequencies below 3 MHz. The LPF output 104 is input to a comparator circuit 106 that also has a fixed input 104 representing a predetermined threshold. The comparator output 108 is input to analog-to-digital converter (ADC) 110 and then to digital controller 29. If the MR signal amplitude 104 is greater than the threshold 105, the comparator output 104 represents HDC. Table 1 below shows normalized output from LPF 102 for various levels of heater power, with the LPF output for zero heater power (no HDC) being 1.00.

TABLE 1

| Heater Power (mW) | LPF Output |
|---|---|
| 0.0 | 1.00 |
| 3.7 | 1.00 |
| 14.8 | 1.01 |
| 33.4 | 1.03 |
| 59.4 | 1.06 |
| 92.7 | 1.09 |
| 116.3 | 1.58 |
| 133.5 | 3.89 |
| 147.1 | 4.12 |

A bandpass filter (BPF) may be used in place of LPF 102 if it is desired to detect the MR signal within a narrow specific range, e.g., 0.5 to 1.5 MHz. Also, the comparator circuit 106 may be a Schmitt trigger that has one input voltage and one output voltage that can be either high or low. When the input is below a certain low threshold, the output is low; when the input is above a certain higher threshold, the output is high; and when the input is between the two thresholds, the output retains its value. In this implementation the higher threshold of the Schmitt trigger would represent the threshold above which HDC is determined. The advantage of a Schmitt trigger over a comparator circuit with a single input threshold is that the Schmitt trigger is more stable. With only one input threshold, a noisy input signal near that threshold can rapidly switch back and forth, a phenomenon know as "squegging" in analog circuits, causing the output to switch back and forth from low to high.

The threshold value can be selected based on the data shown in Table 1. For example, if the MR signal at HDC is a first amplitude (approximately 4), and the MR signal without HDC is a second amplitude (1.0), the threshold value can be selected to be some percentage of the difference between the first and second amplitudes, e.g., 25 percent, added to the second amplitude. Thus, in this example for this particular HGA, the threshold would be 1.00 plus 25 percent of the difference (3.0), or 1.75, so if the MR signal is greater than 1.75 this would indicate HDC. Alternatively, as can be seen from Table 1, there is a sudden almost step-like increase in the LPF output at HDC. So if enough data samples are obtained for a particular HGA, the threshold can be determined directly from an inspection of the data. With this method, an inspection of Table 1 would indicate that the threshold can be set to approximately 1.5.

FIG. 4 illustrates an analog implementation of the system. However, the invention can also be implemented with digital techniques. The same digital signal processing techniques and data analysis performed by the digital oscilloscope or disk drive analyzer can be programmed into controller 29. Thus controller 29 analyzes the digitized MR signal from R/W channel 25 and compares the calculated amplitude with a predetermined threshold value. This can be implemented by microcode (firmware) for disk drives or custom modules for DET testers.

In either implementation, if HDC is determined, controller 29 generates a signal or signals to take corrective action. In one example the signal on line 58 would be a "write inhibit" signal sent to R/W channel 25 to prevent the write head 70 from writing data because of an impending head crash. In another example, the signal on line 83 would signal the FHC 82 to reduce heater power to move the head away from the disk.

While the invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A head-disk tester for determining head-disk contact (HDC) comprising:
   a rotatable magnetic recording disk having no recorded magnetic transitions;
   an air-bearing slider maintained near the surface of the disk when the disk is rotating;
   a magnetoresistive (MR) read head on the slider, the MR read head providing, at a frequency less than about 3 MHz, an MR signal having a first amplitude with HDC and a second amplitude without HDC;
   a fly-height actuator for changing the spacing between the read head and the disk surface;
   a filter for detecting the amplitude of the MR signal from the read head at a frequency less than about 3 MHz; and
   a Schmitt trigger connected to the output of the filter for providing a high output when the filter output is above a threshold, said threshold representing said second MR signal amplitude plus a predetermined percentage of the difference between said first and second MR signal amplitudes.

2. The system of claim 1 further comprising a digital controller for signaling HDC and an analog-to-digital converter connecting the output of the Schmitt trigger to the controller.

3. The head-disk tester of claim 1 wherein the head fly-height actuator is located on the slider and is one of a thermal actuator, an electrostatic actuator and a piezoelectric actuator.

4. A head-disk tester for determining head-disk contact (HDC) comprising:
   a rotatable disk having no magnetic recording layer;
   an air-bearing slider maintained near the surface of the disk when the disk is rotating;
   a magnetoresistive (MR) read head on the slider, the MR read head providing, at a frequency less than about 3 MHz, an MR signal having a first amplitude with HDC and a second amplitude without HDC;
   a fly-height actuator for changing the spacing between the read head and the disk surface;
   a filter for detecting the amplitude of the MR signal from the read head at a frequency less than about 3 MHz; and
   a comparator connected to the output of the filter for comparing the MR signal amplitude to a threshold, said threshold representing said second MR signal amplitude plus a predetermined percentage of the difference between said first and second MR signal amplitudes.

5. The head-disk tester of claim 4 wherein the head fly-height actuator is located on the slider and is one of a thermal actuator, an electrostatic actuator and a piezoelectric actuator.

* * * * *